United States Patent
Toniatti et al.

(10) Patent No.: US 7,289,526 B2
(45) Date of Patent: Oct. 30, 2007

(54) METHOD FOR REDUCING THE RADIO CHANNEL THE ACCESS DELAY IN WIRELESS COMMUNICATION SYSTEM

(75) Inventors: Tiziana Toniatti, Milan (IT); Dino Saija, Rometta Marea (IT)

(73) Assignee: Siemens S.p.A. Viale Piero e Alberto Pirelli, Milan (IT)

( * ) Notice: Subject to any disclaimer, the term of this patent is extended or adjusted under 35 U.S.C. 154(b) by 916 days.

(21) Appl. No.: 10/684,404

(22) Filed: Oct. 15, 2003

(65) Prior Publication Data

US 2004/0081132 A1    Apr. 29, 2004

Related U.S. Application Data

(63) Continuation of application No. PCT/EP02/00359, filed on Jan. 16, 2002.

(30) Foreign Application Priority Data

Apr. 18, 2001    (EP) .................................. 01830262

(51) Int. Cl.
    *H04B 7/212*    (2006.01)
(52) U.S. Cl. ................ 370/442; 370/278; 370/337
(58) Field of Classification Search ................ 370/252, 370/278, 336, 337, 347, 442
    See application file for complete search history.

(56) References Cited

U.S. PATENT DOCUMENTS 6,940,824 B2 *   9/2005   Shibutani .................... 370/252

FOREIGN PATENT DOCUMENTS

| EP | 0 917 317 A1 | 5/1999 |
|---|---|---|
| EP | 1 005 243 A1 | 5/2000 |
| WO | WO 00/14979 | 3/2000 |

* cited by examiner

*Primary Examiner*—John Pezzlo
(74) *Attorney, Agent, or Firm*—Siemens S.p.A.

(57) ABSTRACT

A method for minimizing the access delay in wireless communication systems, e.g. GPRS (General Packet Radio Service) networks, which includes at least a base station system and at least a mobile terminal having a communication context with the GPRS network. The above mentioned mobile terminal is also adapted to open a communication with the radio access network of said base station system to initiate a Temporary Block Flow or TBF establishment each time has to transmit data packets to the network and the TBF is released when the transmission of the packet has been completed. The TBF establishment is requested by means of a Radio Link Control message or RLC called Packet Channel Request or PCR sent on one of the Control Channel of the GPRS radio access and in particular on the Packet Random Access Channel or PRACH. The GPRS data packets and messages are organized in frame with a predetermined number of TDMA slots and in multiframe. According to the method, when the mobile has at least a Link Layer Control or LLC to transmit it send a PCR message on the PRACH and said PCR message is transmitted in a TDMA slot randomly selected on the TDMA slots that compose the first PRACH block.

4 Claims, 4 Drawing Sheets

PRACH Block Type composed by four TDMA slots.

*52 Multiframe Structure*

X = Idle frame
B0 - B11 = Radio blocks
Radio block = 4 TDMA slots

Case 1

Case 2

Case 3

*PRACH Block Type composed by four TDMA slots.*

METHOD FOR REDUCING THE RADIO CHANNEL THE ACCESS DELAY IN WIRELESS COMMUNICATION SYSTEM

CROSS REFERENCE TO RELATED APPLICATIONS

The present application is a continuation of International Application PCT/EP02/00359, filed on 16 Jan. 2002, which designated the United States, and further claims priority to European patent application 01830262.0, filed on 18 Apr. 2001, the both of which are herein incorporated by reference.

BACKGROUND OF THE INVENTION

The present invention discloses a method for minimizing the access delay in wireless communication systems. The term "wireless communication system" refers generally to any communication system which enable wireless communication between wireless communication devices and the fixed part of the system when the user of the wireless communication device is moving within the service area of the system.

In the following section, we refer in particular to the GPRS (General Packet Radio Service) wireless communication system, but the present invention is not limited thereto being the present invention applicable to any kind of wireless communication including other extensions of GPRS such as the evolution of GPRS radio access, i.e., GERAN (GSM Edge Radio Access Network), or the application of GPRS concepts in the 3GPP (Third Generation Partnership Project) network.

GPRS (General Packet Radio Service) network has being standardized at the time of filing the present application by ETSI (European Telecommunications Standards Institute), having issued the following documents:

[GSM 04.60], ETSI EN 301 349 V8.0.0, "Radio Link Control/Medium Access Control (RLC/MAC) protocol", Digital cellular telecommunications system (Phase 2+);

General Packet Radio Service (GPRS); Mobile Station (MS)—Base Station System (BSS) interface; (version 8.0.0 Release 1999).

In particular the present invention relates to a method for accessing the PRACH channel (Packet Random Access CHannel) of the GPRS system in order to optimize the throughput on the PRACH, minimizing the access delay and reducing the number of loss requests due to collisions.

The method of the invention does not require any change on the fixed part of the system side, and it has a low impact on the wireless communication device side. During the last few years, we have assisted at the great success of mobile conversational services. Mobile phone is now the most common device and it is almost exceptional to find someone without at least one mobile.

Next challenge for mobile industry is to provide mobile networks for data communications. In fact, in the next five years, the traffic load generated by packet mobile services is foreseen to equal that generated by mobile circuit-based services.

The efficient and optimized support of data packet services is one of the main objectives in standard bodies and for defining the specifications for the next generation of mobile networks such as 3GPP (3rd Generation Partnership Program), 3GPP2, IMT-2000, IETF (Internet Engineering Task Force), and MWIF (Mobile Wireless Internet Forum). At the same time, the mobile operators around all Europe are preparing, at the time of filing this application, the launch of GPRS (Generic Packet Radio Service) to provide mobile data service.

General Packet Radio Services (GPRS) offers an efficient utilization of radio resources for packet services characterized by a discontinuous bit rate generation. The basic idea beyond GPRS is to use the radio time slots of GSM access unused from voice service to carry in a packet mode fashion asynchronous data. The allocation of channels is flexible: the network can allocate from 1 to 8 time slots and rates that can be theoretically up to 160 kbit/s. Active users share same radio resources and up- and down channel may be reserved separately.

GPRS uses the same radio Base Station (BTS) as voice with HW and SW upgrades in the BSC (Base Station Controller), and a completely new core network. This choice allows leaving untouched the radio access elements that represent the main investment for an operator. The new core network elements are the Serving GPRS Support Node (SGSN), a router responsible for terminals in a given region and the Gateway GPRS Support Node (GGSN), a router linked to an external data network (e.g., Internet) and responsible for routing packets to the appropriate SGSN.

As radio is a limited resource, the efficient utilization of radio access is an important point and it can be bottleneck of the system. Thus, the good configuration of the control and data channels on the radio access is a critical issue.

Let assume that a mobile terminal has already a communication context with the GPRS network.

Each time the mobile has a packet to transmit, it has to open a second communication context with the radio access network and initiate a TBF (Temporary Block Flow) establishment. This context is opened each time the mobile has to transmit packets to the network and it is released when the transmission of the packets has been completed.

The TBF establishment can be requested by an RLC (Radio Link Control) message called PCR (PACKET CHANNEL REQUEST) sent on the PRACH (Packet Random Access CHannel). PRACH is one of the Control CHannel (CCH) of the GPRS radio access.

The current specification defines in section 7.1.2.1.1 of [GSM 04.60] the algorithm to access the PRACH and to initiate a TBF (Temporary Block Flow) establishment by the mobile station on PCCCH (Packet Common Control CHannel).

This algorithm consists of the main following steps:

Step 1)

When the mobile has an LLC (Link Layer Control) frame to transmit, but without having a TFB already allocated, it sends a PCR (PACKET CHANNEL REQUEST) message on the PRACH.

Step 2)

The first attempt to send the PCR message is done in the first possible TDMA frame containing PRACH on PDCH (Packet Data Traffic CHannel) matching the mobile station's PCCCH_GROUP if the following test is passed. The test requires that the Persistency Level P(i) value is less or equal than the number R uniformly selected by the mobile in the interval [0, 15], i.e., $$P(i) \leq R \qquad [1]$$

The P(i) is defined by the network, paged to the mobiles and can have four different values related to the four different priority classes i $\in[1-4]$. The default value of P(i) is 0.

For instance, if we set (P[1]=0, P[2]=3, P[3]=7, P[4]=16), it means that a mobile requiring resources with the highest priority (1) will ever pass the test and always transmit in the first TDMA frame of the PRACH, the mobile with radio priority 2 and 3 will have respectively probability ¾ and ½ to pass the test, while the mobile requiring a TFB with the lowest priority will never pass the test.

Step 3)

If the test [1] is not successfully, the terminal has to wait. The value of TDMA frames of the PRACH it has to wait is obtained by extracting a sample in the range [S, S+T−1]. S and T values are determined by extraction from two sets of numbers defined in [GSM 04.60 Section 12.14]. Therefore, if the test [1] is not successful, the number of TDMA frames of PRACH it has to wait before it can send a request on the media varies between 12 and 267.

Step 4)

The mobile repeats the same procedure of step 3 for almost MAX_RETRANS (the maximum number of retransmission) times to schedule retransmissions of the PCR message until it receives response from the network. Retransmissions are needed due to both collisions with PCRs of other mobiles and transmission errors on the channel. MAX_RETRANS value depends on the radio priority and it is defined in [GSM04.60 Section 12.14].

Step 5)

If either the maximum number of MAX_RETRANS or the timer T3186 expires, the access procedure is aborted and the mobile starts a cell reselection.

The algorithm is efficient and works well when PRACH slots are uniformly distributed in the PDCH [see FIG. 2 case 1] and, thus, the entire PDCH is dedicated to PRACH channel. That is not the case of other configurations where only a few PDTCH frames are devoted to PRACH as shown in FIG. 2, case 2 and case 3.

In fact, let consider the PRACH configurations of FIG. 1 case 2 and case 3 and let assume that LLC arrival is a random process and, then, the access procedures are initiated randomly during a frame.

As TDMA channels for a PRACH block are grouped into four, if PCR messages are transmitted in the first TDMA slot, then, in the first TDMA slot of the PRACH Block there is a higher probability to have collisions due to PCR messages than in the other TDMA slots. This effect can be observed in FIG. 3 in case 2 where the PRCs related to the transmission requests of LLC frames 1 and 2 and in case 3 where the PRCs related to the transmission requests of LLC frames 1, 2 and 3 are transmitted in the first slot of the PRACH Block generating collision.

In the current ETSI specification, it is possible to decrease collisions on the first of the four slots in the PRACH Block by increasing the values of Persistency Level, P(i). In fact, the higher the P(i) value the higher the probability to reschedule PCR transmission randomly in the next slots of the PRACH.

However, this strategy leads to a higher access delay and it increases the probability to abort the access procedures due to the expiration of timer T3186.

The effect of this known strategy is therefore to augment the access delay to the PRACH channel and to increase the probability to abort the access procedure.

BRIEF SUMMARY OF THE INVENTION

An object of the present invention is to overcome the drawbacks of the approach disclosed in the above mentioned ETSI specification aiming to decrease collisions on the first of the four slots in the PRACH Block and to define a method adapted to avoid collisions.

According to the invention, the collisions technical problem have been solved using the method disclosed in the preamble of the appended claim 1, addressed to a method adapted to reduce collisions for every configuration of PRACH on the Multiframe (see FIG. 1). The claimed method brings to a significant gain in terms of load on the PRACH channel, the minimization of the access delay, and the reduction of the probability to terminate the access procedure due to expiration of time out.

As mentioned before, currently, the ETSI specification [section 7.1.2.1.1 of GSM 04.60] suggests to perform the first attempt to send the PCR message in the first possible TDMA frame containing PRACH on PDCH (Packet Data Traffic CHannel) matching the mobile station's PCCCH-_GROUP.

According to the invention, instead to require the transmission in the first possible TDMA of the PRACH (STEP 2), is suggested to select randomly one of the TDMA slots that compose the first PRACH Block.

According to the above, considerable advantages are achieved with the present invention when compared with method and systems of prior art and these advantages will be obvious by observing the graphs contained from FIG. 4 to FIG. 8 disclosed in details hereinafter.

BRIEF DESCRIPTION OF THE SEVERAL VIEWS OF THE DRAWINGS

The invention, together with further objects and advantages thereof, may be understood with reference to the following description, taken in conjunction with the accompanying drawings and in which.

DETAILED DESCRIPTION OF THE INVENTION

Figure 1:
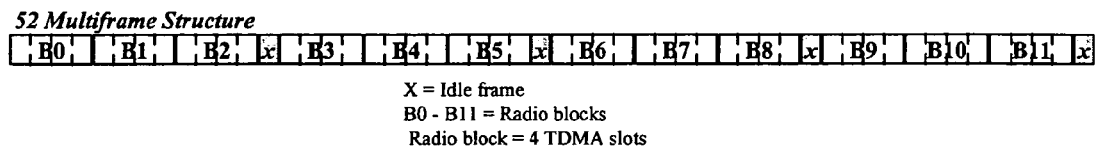
FIG. 1 is an illustration of the 52 Multiframe on one PDCH.

FIG. 1 shows the GPRS 52 Multiframe on a PDCH. Each GPRS 52 Multiframe carries 12 RLC Blocks. Each RLC block consists of 4 TDMA slots. (12×4 RLC slots+4 Idle frame=52 Slots).

Figure 2:
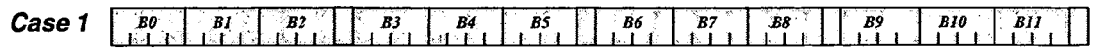
FIG. 2 is a first illustration of one PDCH of the 52 Multiframe with different configurations of PRACH.
Figure 2:
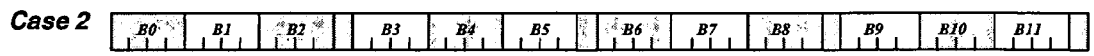
Figure 2:
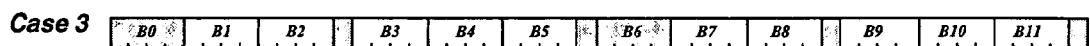
Figure 2:
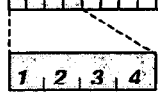
Figure 3:
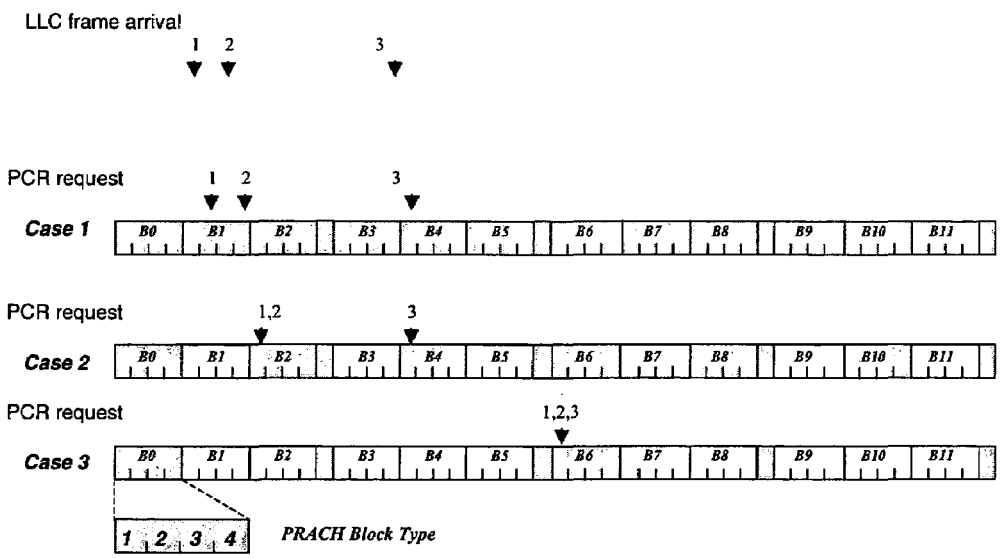
FIG. 3 is a second illustration of one PDCH of the 52 Multiframe with different configurations of PRACH, example of LLC frames arrival and PCR requests on the PRACH transmitted according to the method of the invention.

FIG. 2 shows a generic PDCH of the GPRS 52 Multiframe with different configurations of PRACH. In Case 1, PRACH slots are uniformly distributed in the PDCH and the entire PDCH is dedicated to PRACH channel. Case 2 and Case 3 with 6 and 2 PRACH blocks of the PDCH are dedicated to the PRACH channel.

Let consider the following performance metrics:

O the offered load on the PRACH, which denotes the mean arrival of PCR messages in a Multiframe to the number of PRACH slots in the Multiframe, D the served load by the PRACH, which is the mean number of successfully transmitted PCR messages which do not encounter collisions in a Multiframe to the number of PRACH slots in the Multiframe, G the effective load on the PRACH which includes the additional load generated by the retransmission of PCR messages, T the access time to the PRACH [ms], i.e., the time interval between an LLC request and the successful access of the PCR message on the PRACH, p the probability to abort the access procedures due to collisions.

Two different configurations of PRACH shown in FIG. 2 have been taken into account:

case 2 with 6 PRACH blocks for Multiframe, and case 3 with 2 PRACH blocks for Multiframe.

For the metrics defined in the previous list, we have compared in the following drawings the performances of the current algorithm (current) with the improvement of the present invention (proposal) with a homogeneous traffic load generated randomly with:

radio priority 1 (i.e., MAX_TRANSM=1) and P(1)=1 and P(1)=5, radio priority 4 (i.e., MAX_TRANSM=7) and P(1)=1 and P(4)=5.

Figure 4:
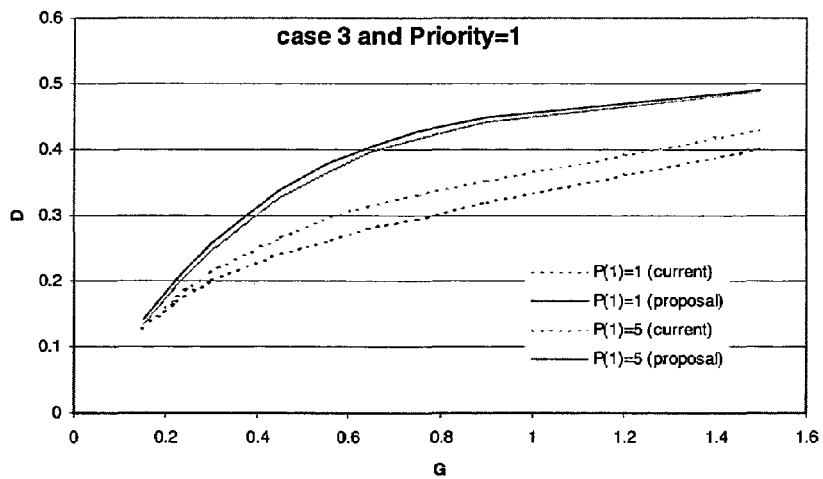
FIG. 4 is a diagram showing the Served load (D) versus Effective load (G) for PRACH configuration of FIG. 2 case 3 and Priority=1.

The evaluation study has been obtained by simulation. FIG. 4 is a diagram showing the Served load (D) versus Effective load (G) for PRACH configuration of FIG. 2 case 3 and Priority=1. Dotted lines refer to performances obtained with the current proposal with respective P(1)=1 and P(1)=5. Continuous lines refer to performances obtained with our proposal with respective P(1)=1 and P(1)=5.

Figure 5:
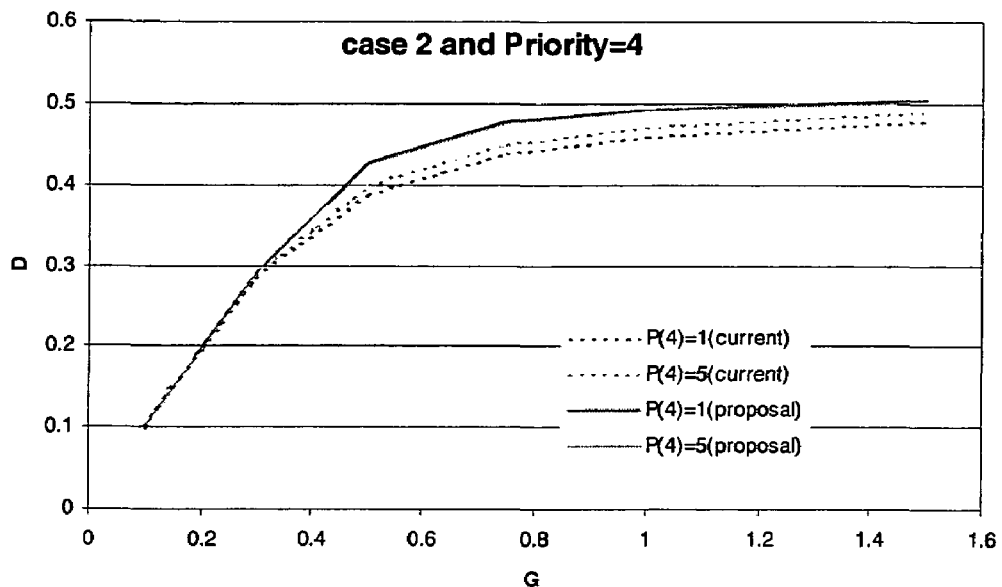
FIG. 5 is a diagram showing the Served load (D) versus Effective load (G) for PRACH configuration of FIG. 2 case 2 and Priority=4.

FIG. 5 is a diagram showing the Served load (D) versus Effective load (G) for PRACH configuration of FIG. 2 case 2 and Priority=4. Dotted lines refer to performances obtained with the current proposal with respective P(4)=1 and P(4)=5. Continuous lines refer to performances obtained with the method of the invention with respective P(4)=1 and P(4)=5.

FIG. 4 and FIG. 5 show therefore served load (D) vs. the effective load (G) with the current method specified in [GSM 04.60] and with the method of the invention respectively case 2 of channel configuration (FIG. 5), and case 3 of PRACH configuration (FIG. 4).

As it can be noted, the current algorithm (dotted lines) obtains better performances in terms of served load with the higher value of Persistency Level.

The method of the invention provides always higher served load values with respect to that of the current specification, while the served load is not sensitive to Persistence Level values.

Regarding the configuration of the PRACH of course we achieve better performance with the lower number of PRACH blocks in the Multiframe, i.e., PRACH configuration case 3.

Figure 6:
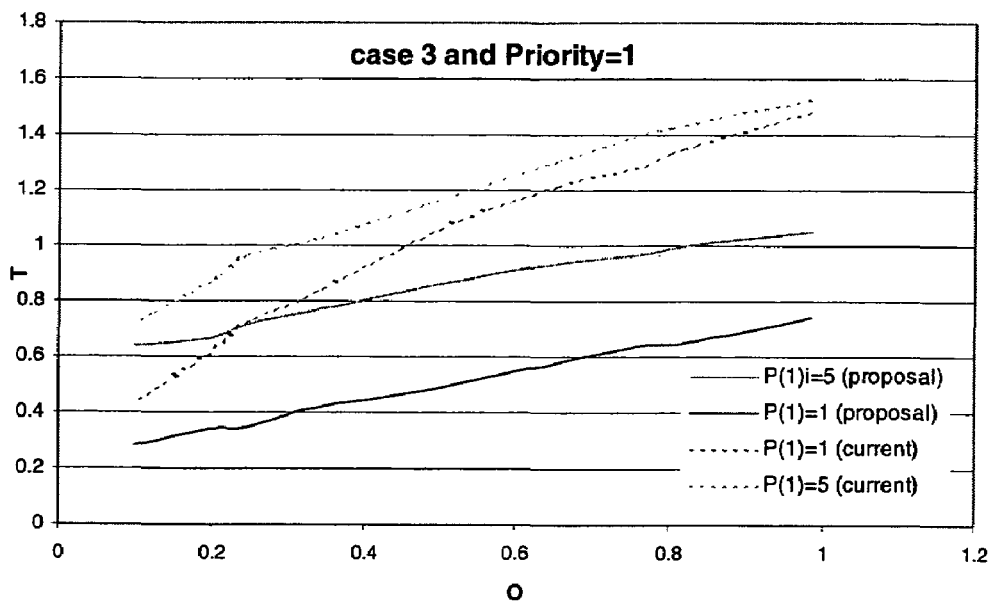
FIG. 6 is a diagram showing the mean access delay (T) in [ms] versus offered load (O) for PRACH configuration of FIG. 2 case 3 and Priority=1.

FIG. 6 is a diagram showing the mean access delay (T) in [ms] versus offered load (O) for PRACH configuration of FIG. 2 case 3 and Priority=1. Dotted lines refer to performances obtained with the current proposal with respective P(1)=1 and P(1)=5. Continuous lines refer to performances obtained with the method of the invention with respective P(1)=1 and P(1)=5.

Figure 7:
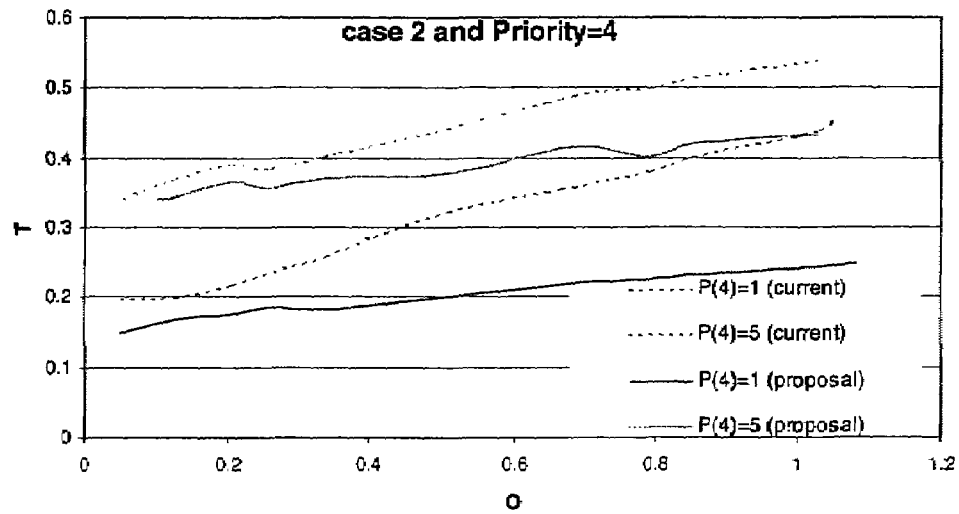
FIG. 7 is a diagram showing the mean access delay (T) in [ms] versus offered load (O) for PRACH configuration of FIG. 2 case 2 and Priority=4.

FIG. 7 is a diagram showing the Mean access delay (T) in [ms] versus offered load (O) for PRACH configuration of FIG. 2 case 2 and Priority=4. Dotted lines refer to performances obtained with the current proposal with respective P(4)=1 and P(4)=5. Continuous lines refer to performances obtained with the method of the invention with respective P(4)=1 and P(4)=5.

FIG. 6 and FIG. 7 show therefore the access delay versus the offered load on the PRACH with the current method specified in [GSM 04.60] and with our proposal with respectively case 2 of PRACH configuration (FIG. 7), and case 3 of PRACH configuration (FIG. 6).

Considering the access delay, the mean access delay values obtained using the method of the present invention (continuous line) are much better than that provided by the current method (dotted lines).

For both for case 3 (FIG. 6) and case 2 (FIG. 7), the claimed method achieves mean access delay values even than two times lower with respect to the current algorithm.

The original proposal has better performances in terms access delay with the low value of Persistency Level, but it produces lower values of offered load.

On the contrary, with the method of the invention it is possible to maximize both the throughput and minimize the access delay.

Figure 8:
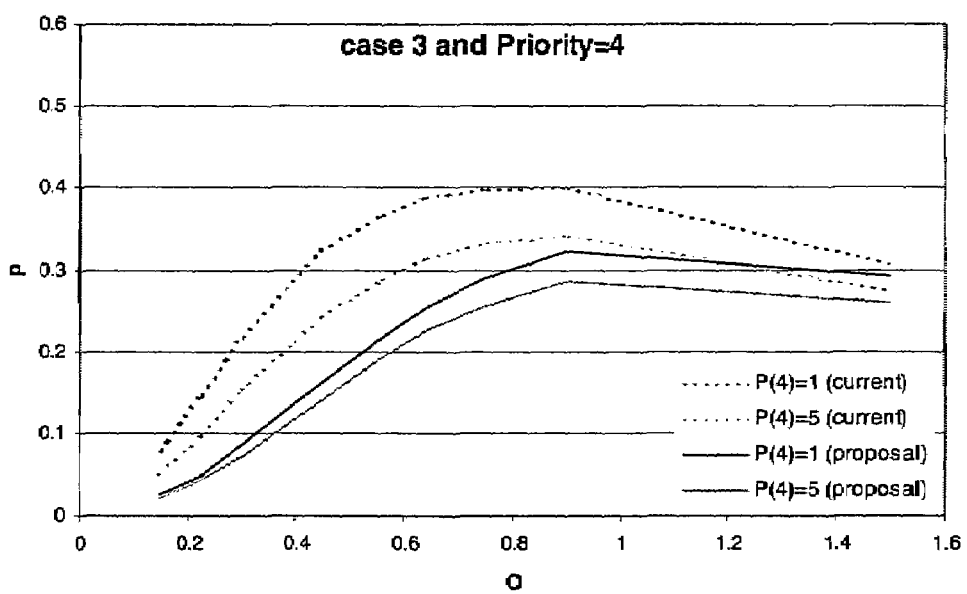
FIG. 8 is a diagram showing the probability to abort the access procedure (p) versus offered load (O) for PRACH configuration of FIG. 2 case 3 and Priority=4.

FIG. 8 is a diagram showing the probability to abort the access procedure (p) versus offered load (O) for PRACH configuration of FIG. 2 case 3 and Priority=4. Dotted lines refer to performances obtained with the current proposal with respective P(4)=1 and P(4)=5. Continuous lines refer to performances obtained with our proposal with respective P(4)=1 and P(4)=5.

FIG. 8 shows therefore the probability to abort the access procedures due to collisions versus the offered load with the current method specified in [GSM 04.60] (dotted lines) and with the method of the invention (continuous lines) with case 3 of PRACH configuration.

The original proposal obtains good performances in term probability to abort the access procedures due to collisions with the highest value of Persistency Level P=5 but this setting leads to high values of access time.

The method of the invention produces lower probability values to abort the access procedures with respect to the values of the current method minimizing both the access delay and maximize the served load.

Therefore, while a particular embodiment of the present invention has been shown and described, it should be understood that the present invention is not limited thereto since other embodiments may be made by those skilled in the art without departing from the above mentioned object.

It is thus contemplated that the present invention encompasses any and all such embodiments covered by the following claims.

We claim:

1. A method for minimizing the access delay in a wireless communication system including at least a base station system and at least a mobile terminal having communication capability with a fixed part of a wireless communication system and being adapted to open a communication with a radio access network of the base station system so as to initiate a Temporary Block Flow establishment each time data packets are to be transmitted to the radio access network and the Temporary Block Flow being released when the transmission of the packet has been completed, comprising the steps of:

requesting Temporary Block Flow establishment by means of a Radio Link Control message sent on one of a Control Channel of the radio access and Packet Random Access Channel;

sending the Radio Link Control message on a TDMA slot of the Packet Random Access Channel channel;

organizing the Packet Random Access Channel on a predetermined number of TDMA slots in a multiframe;

grouping the TDMA slots by four to form a Packet Random Access Channel; and when the mobile terminal has at least a packet to transmit, it sends a Packet Channel Request message on the Packet Random Access Channel and the Packet Channel Request message is transmitted in a TDMA slot randomly selected among the TDMA slots that compose a first PRACH block.

2. The method of claim 1, wherein the wireless communication system is a GPRS system.

3. The method of claim 2, wherein the a GPRS system is equipped with GERAN radio access.

4. The method of claim 1, wherein the wireless communication system is a 3 GPP system.

* * * * *